United States Patent
Hornburg

(10) Patent No.: US 9,023,548 B2
(45) Date of Patent: May 5, 2015

(54) FUEL CELL SYSTEM AND VEHICLE HAVING FUEL CELL SYSTEM

(75) Inventor: Gerald Hornburg, Holzmaden (DE)

(73) Assignee: Daimler AG, Stuttgart (DE)

( * ) Notice: Subject to any disclaimer, the term of this patent is extended or adjusted under 35 U.S.C. 154(b) by 1747 days.

(21) Appl. No.: 12/377,970

(22) PCT Filed: Aug. 17, 2007

(86) PCT No.: PCT/EP2007/007281
§ 371 (c)(1),
(2), (4) Date: Apr. 13, 2011

(87) PCT Pub. No.: WO2008/022748
PCT Pub. Date: Feb. 28, 2008

(65) Prior Publication Data
US 2011/0183230 A1    Jul. 28, 2011

(30) Foreign Application Priority Data
Aug. 19, 2006   (DE) .......................... 10 2006 039 105

(51) Int. Cl.
| | |
|---|---|
| H01M 2/20 | (2006.01) |
| H01M 8/24 | (2006.01) |
| H01M 8/04 | (2006.01) |
| B60K 1/04 | (2006.01) |
| H01M 8/10 | (2006.01) |

(52) U.S. Cl.
CPC ............... *H01M 8/2465* (2013.01); *B60K 1/04* (2013.01); *H01M 8/04089* (2013.01); *H01M 8/04201* (2013.01); *H01M 8/04253* (2013.01); *H01M 8/249* (2013.01); *H01M 2008/1095* (2013.01); *H01M 2250/20* (2013.01); *Y02T 90/32* (2013.01); *Y02E 60/50* (2013.01)

(58) Field of Classification Search
USPC .......... 429/443, 452, 469, 470, 467; 180/68.5
See application file for complete search history.

(56) References Cited

U.S. PATENT DOCUMENTS

| | | | | |
|---|---|---|---|---|
| 4,615,107 | A * | 10/1986 | Kumeta et al. ............... | 29/623.1 |
| 2003/0108784 | A1* | 6/2003 | Enjoji et al. ..................... | 429/34 |
| 2004/0031632 | A1* | 2/2004 | Kohda et al. ................. | 180/68.5 |

FOREIGN PATENT DOCUMENTS

| | | |
|---|---|---|
| DE | 102 97 132 T5 | 7/2004 |
| EP | 0 980 107 A1 | 2/2000 |
| EP | 1 309 026 A1 | 5/2003 |

OTHER PUBLICATIONS

International Search Report dated Nov. 16, 2007 (Three (3) pages).

* cited by examiner

*Primary Examiner* — Patrick Ryan
*Assistant Examiner* — Julian Anthony
(74) *Attorney, Agent, or Firm* — Crowell & Moring LLP

(57) ABSTRACT

A fuel cell system 1 has at least one fuel cell stack 2, which comprises a plurality of plate-shaped fuel cells 10. A retaining device 3 is provided for installing the fuel cell stack in a vehicle 6. When the fuel cell stack 2 is installed in the vehicle 6, the plate-shaped fuel cells 10 are arranged inclined relative to the vertical 9.

8 Claims, 3 Drawing Sheets

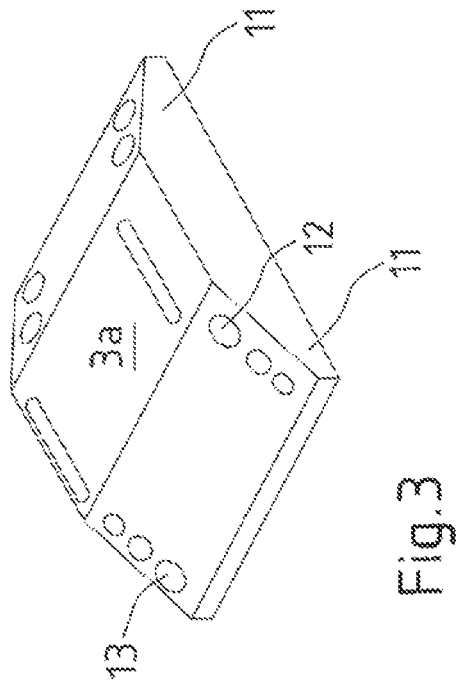
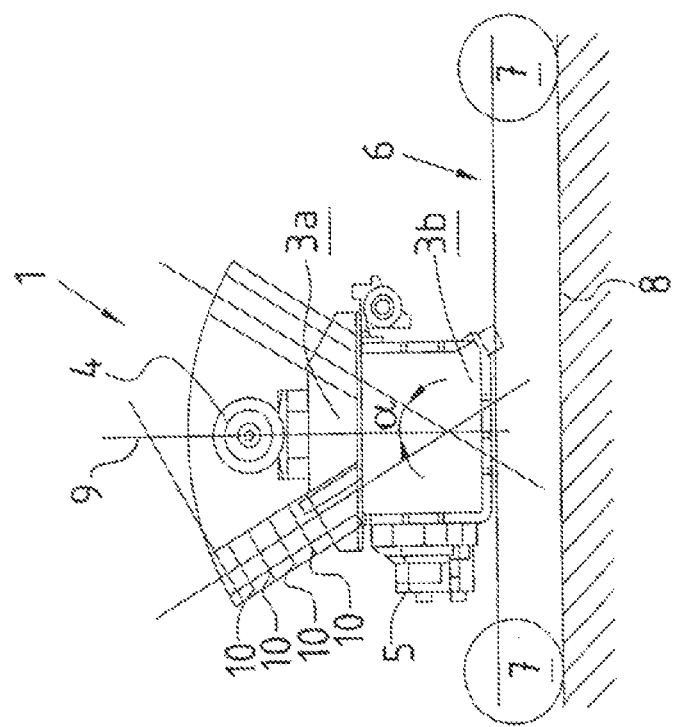
Fig.3
Fig.2

FUEL CELL SYSTEM AND VEHICLE HAVING FUEL CELL SYSTEM

CROSS-REFERENCE TO RELATED APPLICATIONS

This application is related to U.S. patent application Ser. No. 12/377,969 filed concurrently herewith.

BACKGROUND AND SUMMARY OF THE INVENTION

This application is a national stage of PCT International Application No. PCT/EP2007/007281, filed Aug. 17, 2007, which claims priority under 35 U.S.C. §119 to German Patent Application No. 10 2006 039 105.5, filed Aug. 19, 2006, the entire disclosure of which is herein expressly incorporated by reference.

The invention relates to a fuel cell system having at least one fuel cell stack, that includes a plurality of plate-shaped fuel cells, and having a retaining device with which the fuel cell stack may be installed in a vehicle, and to a vehicle having a corresponding fuel cell system.

Fuel cell stacks for mobile service, particularly for operating vehicles, conventionally comprise a plurality of plate-shaped fuel cells which are arranged in a stack. The stack-shaped arrangement, on the one hand, saves space. On the other hand, the fuel cells are arranged in this way in electrical series connection in order to produce the overall voltage required for the particular intended application. The individual fuel cells comprise a cathode zone and an anode zone, which are separated by a membrane, for example a PEM membrane.

As is disclosed, for example, in German patent document DE 10 297 132 T5, which relates to a vehicle chassis and probably constitutes the closest prior art, such fuel cell stacks in vehicles are generally arranged horizontally, such that the vehicle's overall center of gravity is kept as low as possible. Alternatively, it is also proposed in one embodiment in this document to arrange the fuel cell stack vertically.

One object of the invention is to provide a fuel cell system with improved operating behaviour, in particular for cold or sub-freezing starting.

Another object of the invention is to provide a vehicle having such a fuel cell system.

These and other objects and advantages are achieved by the fuel cell system according to the invention, which comprises at least one fuel cell stack with a plurality of plate-shaped fuel cells. The plate-shaped fuel cells are preferably arranged congruently in a stack, and are pressed together by clamping elements to ensure mechanical stability and good electrical conductivity between the fuel cells. The fuel cells are here preferably of PEM construction, but the invention may in general also relate to fuel cells of other types. One of the at least one fuel cell stacks comprises a plurality of plate-shaped fuel cells, preferably more than 50 (in particular more than 150) fuel cells. The fuel cells preferably in each case comprise a bipolar plate and a membrane (PEM). The main distribution channels for feed and/or exhaust air and/or the fuel extend parallel or substantially parallel to the longitudinal extent of the fuel cell stack. The cell distribution structure (also known as flow fields) is arranged preferably in the bipolar plates, parallel to the areal extent of the plate-shaped fuel cells and/or oriented perpendicular to the longitudinal extent of the fuel cell stack.

In order to fasten the at least one fuel cell stack in a vehicle, a retaining device is provided with which the at least one fuel cell stack may be installed, in particular rigidly, in the vehicle.

According to the invention, the plate-shaped fuel cells are installed in the vehicle positioned at an incline relative to the vertical. (Vertical here preferably refers to the perpendicular, and/or is defined relative to the vehicle; thus, for example, as the perpendicular to the areal extent of the vehicle's floor assembly. The inclination does not, however, extend as far as the horizontal and is thus less than 90°.)

The invention is based on the recognition that, when a fuel cell stack is installed horizontally (and thus with upright fuel cells), moisture condenses when the entire fuel cell system cools down and condensate (water) forms in the main distribution channels. On the next cold start, the condensate is conveyed by the gas stream into the cell inlets and the cell distribution structure, and may contribute to uneven gas distribution, causing malfunctions. In the case of a sub-freezing start of the fuel cell system, this effect may have an even more serious impact. When the fuel cell stack is arranged vertically, on the other hand, the condensate does not completely flow out of the cell distribution structure, such that the remaining condensate likewise results in uneven gas distribution on a subsequent cold start or sub-freezing start.

In contrast, an inclined arrangement of the plate-shaped fuel cells ensures first that the condensate is reliably discharged from the individual fuel cells via the cell distribution structure, and second that the discharged condensate may be drained from the fuel cell stack via the main distribution channels. The water which continues to condense from the moist gases during the cooling process simply drains out of the fuel cell stack under gravity and thus causes no disruption on a subsequent cold or sub-freezing start.

The arrangement according to the invention is also a good compromise with regard to absorbing and handling impact stresses: in known horizontally fitted fuel cell stacks, vertical impact stresses may cause permanent deformation and in extreme cases the fuel cell stacks may even be deformed into a banana shape. Such deformation can be counteracted only by elevated prestressing forces of the clamping elements which press the individual fuel cells together. One disadvantage of using elevated prestressing forces, however, is that compression setting of the fuel cells (and thus of the channel structures, and in particular of the cell distribution structures) is accelerated. Compression setting in this case refers to a reduction in the thickness of the components once compression has been applied.

In the arrangement of the fuel cells according to the invention, in the event of impact stresses in the vertical direction, no (or only slight) troublesome shear forces arise between the individual fuel cells or the individual plates of the fuel cells, so that the risk of deformation of the fuel cell stack is reduced. In this way, prestressing of the clamping elements may be reduced, with a resultant positive effect on compression setting of the fuel cells. As a consequence, uniform gas distribution is also ensured over the long term.

In a preferred embodiment, the fuel cells in their areal extent, and/or the at least one fuel cell stack in its longitudinal extent, is/are inclined relative to the vertical by an amount of 10° to 80°, preferably of 30° to 60° and in particular of approx. 60° or 30°. The amount of the inclination should here be determined taking account of condensate drainage from the individual fuel cells and the sensitivity of the fuel cell stack to vertical impact stresses.

Inclination of the fuel cells may in principle be achieved by an inclined arrangement of the individual fuel cells within the fuel cell stack. It is preferred, however, for the fuel cells to be arranged with their areal extent perpendicular (or substantially perpendicular) to the longitudinal extent of the associated fuel cell stack. In this arrangement, compression by means of the clamping elements may be achieved particularly effectively. The inclination of the fuel cells is advantageously achieved by means of an inclination of the fuel cell stack.

In order to elucidate the following description, a cross-sectional plane is defined through the fuel cell system which extends through the vertical. An inclination vector corresponds to the direction of the inclined longitudinal extent of the fuel cell stack and/or is arranged perpendicular to the inclination of the plate-shaped fuel cells.

In a preferred embodiment of the invention, the at least one fuel cell stack has in the cross-sectional plane a side and/or edge portion which is higher due to the inclination, which portion extends in the cross-sectional plane over the entire height or longitudinal extent. Perpendicular to the cross-sectional plane, it extends over the entire width of the fuel cell stack. In this higher side and/or edge portion, the feed air for the fuel cell stack is preferably guided vertically or (substantially vertically) upwards. To this end, main distribution channels are provided, for example, in the higher side and/or edge portion, which channels extend along the fuel cell stack in a vertical or largely vertical direction, in a direction parallel to the inclination vector, and/or in a direction parallel to the longitudinal extent of the fuel cell stack. In other words, the feed air is guided in the zone of the fuel cell stack from which the condensate drains under the effect of the inclination and gravity.

A further embodiment provides that, in a lower side and/or edge portion of the fuel cell stack in the cross-sectional plane, opposite the higher side and/or edge portion, the exhaust air of the fuel cell stack is preferably guided or guidable vertically (or substantially so) downwards. The fuel cell stack preferably comprises main distribution channels for the exhaust air on its lower side and/or edge portion. In other words, the fuel cell stacks exhaust air is guided to where any condensate which arises is guided due to the inclination. The exhaust air is preferably guided vertically downwards, such that the condensate is discharged under the effect of gravity in the direction of flow of the exhaust air.

In order to provide the inclination, the retaining device is preferably constructed as a base which in particular comprises at least one receiving and/or supporting portion, that is wedge-shaped in cross-section for receiving the at least one fuel cell stack. The base preferably also comprises an installation surface, which is arranged perpendicular to the vertical, and forms the contact surface between the base and the vehicle. Alternatively, the retaining device may also be constructed solely as a fastening device, and inclination of the fuel cell stack and/or the fuel cells can be ensured by a corresponding receiving device in the vehicle.

In one particularly preferred and space-saving embodiment, a distributor and/or sump for receiving liquid, such as the condensate, is/are provided in the base and/or in the wedge-shaped receiving portion. In this manner, the base assumes two functions; on the one hand it serves as a retaining device and, on the other hand, it provides a collecting vessel for the condensate which drains away under the effect of gravity.

In one advantageous embodiment, the base comprises two of the wedge-shaped receiving portions, each of which is configured to receive a fuel cell stack.

The two fuel cell stacks are here particularly preferably arranged in a V-shape to one another, so that a space is formed between the fuel cell stacks which advantageously may be used for fitting supply and/or auxiliary devices for the fuel cell stacks. In this manner, a space-saving design has been created for arranging a fuel cell system having two fuel cell stacks, the two fuel cell stacks being compactly arranged, but in particular adequately thermally isolated from one another.

The invention furthermore relates to a vehicle having a fuel cell system, such as described herein, with the plate-shaped fuel cells arranged inclined relative to the vertical. The vehicle is in particular a car.

Other objects, advantages and novel features of the present invention will become apparent from the following detailed description of the invention when considered in conjunction with the accompanying drawings.

BRIEF DESCRIPTION OF THE DRAWINGS

FIG. 2 is a side view of the fuel cell system in FIG. 1, parallel to the cross-sectional plane;

FIG. 3 is an oblique schematic three-dimensional view from above, which shows the base attachment of the fuel cell system in FIGS. 1 and 2;

DETAILED DESCRIPTION OF THE DRAWINGS

Figure 1:
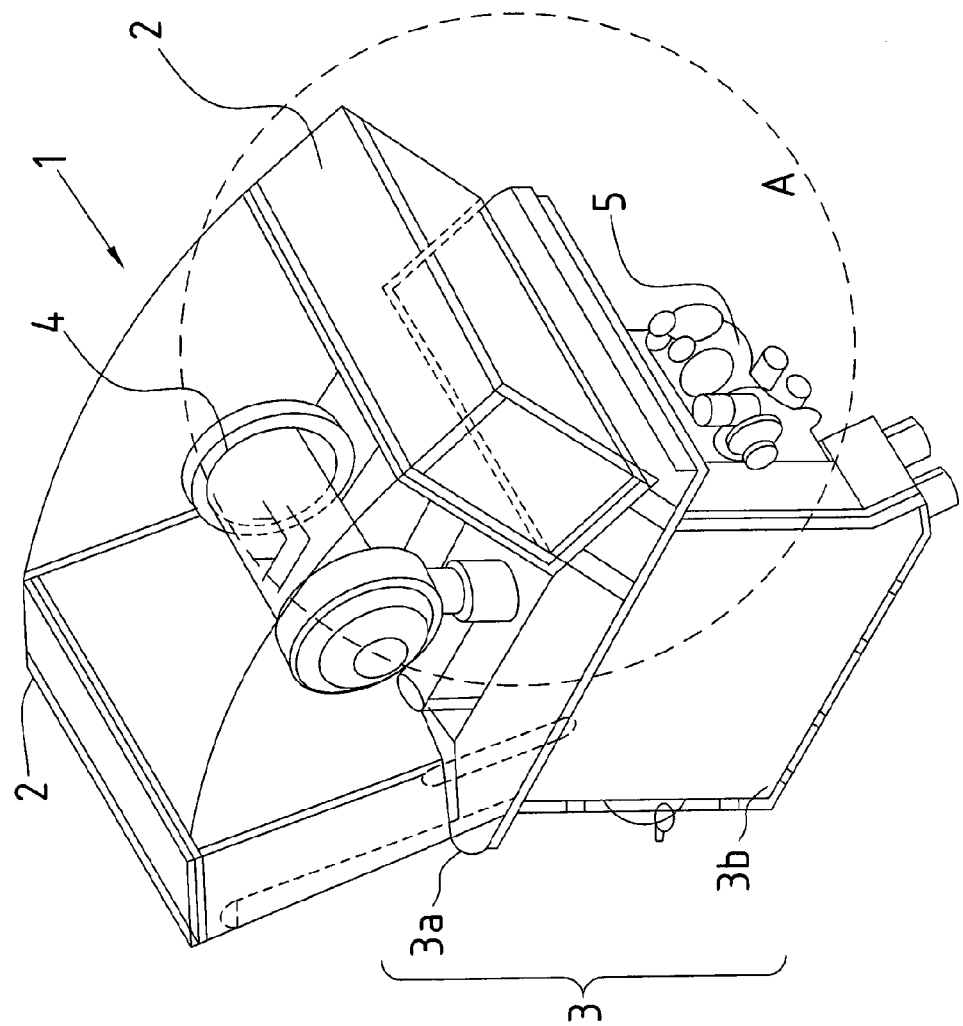
FIG. 1 is a schematic three-dimensional representation of a fuel cell system in a first exemplary embodiment of the invention, viewed obliquely from above.

Parts or dimensions which correspond to one another are denoted by identical reference numerals in the respective figures.

FIG. 1 shows a fuel cell system 1 which comprises two fuel cell stacks 2, which arranged in a V relative to one another and fastened on a common base attachment 3a. Auxiliary units 4 for operation of the fuel cell stacks 2 are arranged between the fuel cell stacks 2, in the interspace formed by the V-shaped arrangement. In the representation of FIG. 1, further units 5 of the fuel cell system 1 or of a drive train of a vehicle (not shown) are also arranged below the base attachment 3a in or on a base body 3b. The base attachment 3a and base body 3b together form a base 3, on one end of which there is arranged the fuel cell stacks 2 and on the other end of which there is arranged an installation surface which forms the contact surface between the base and a vehicle.

In order to elucidate the installation position of the fuel cell system 1 in the vehicle, FIG. 2 shows the fuel cell system 1 once more in side view, also indicating a floor assembly 6 of the vehicle (not shown). In the schematic representation, the floor assembly 6 comprises two wheels 7 which rest on the ground 8 (for example, a road). The fuel cell system 1 is aligned substantially along a vertical 9 which is oriented perpendicular to the ground 8 or to the floor assembly 6. The fuel cell stacks 2 are inclined by an angle alpha=30° relative to the vertical 9. In this exemplary embodiment, the fuel cell stacks 2 are inclined symmetrically, but in other exemplary embodiments, the angles of inclination may also differ. The direction of viewing of the side view in FIG. 2 is perpendicular to a cross-sectional plane which extends through the vertical 9 and the lines representing the inclination of the fuel cell stacks (inclination vectors).

FIG. 2 also shows the individual fuel cells 10 or the plates of individual fuel cells 10, which are arranged perpendicularly to the longitudinal extent of the respective fuel cell stacks 2. Relative to the vertical 9, the individual fuel cells are inclined by an angle $\beta=90°-\alpha=$approx. 60°. In other embodiments, the fuel cell system 1 may be arranged on the floor assembly 6 rotated by any desired angle about the vertical 9.

FIG. 3 shows the base attachment 3a in an enlarged representation viewed obliquely from above. It comprises two wedge-shaped portions 11 which are each configured to receive a fuel cell stack 2, and which each have through openings for feeding feed air and discharging the exhaust air 12 and 13 respectively. In this exemplary embodiment, the base attachment 3a is of one-piece construction; it may alternatively be made up of a plurality of sub-portions.

Figure 4:
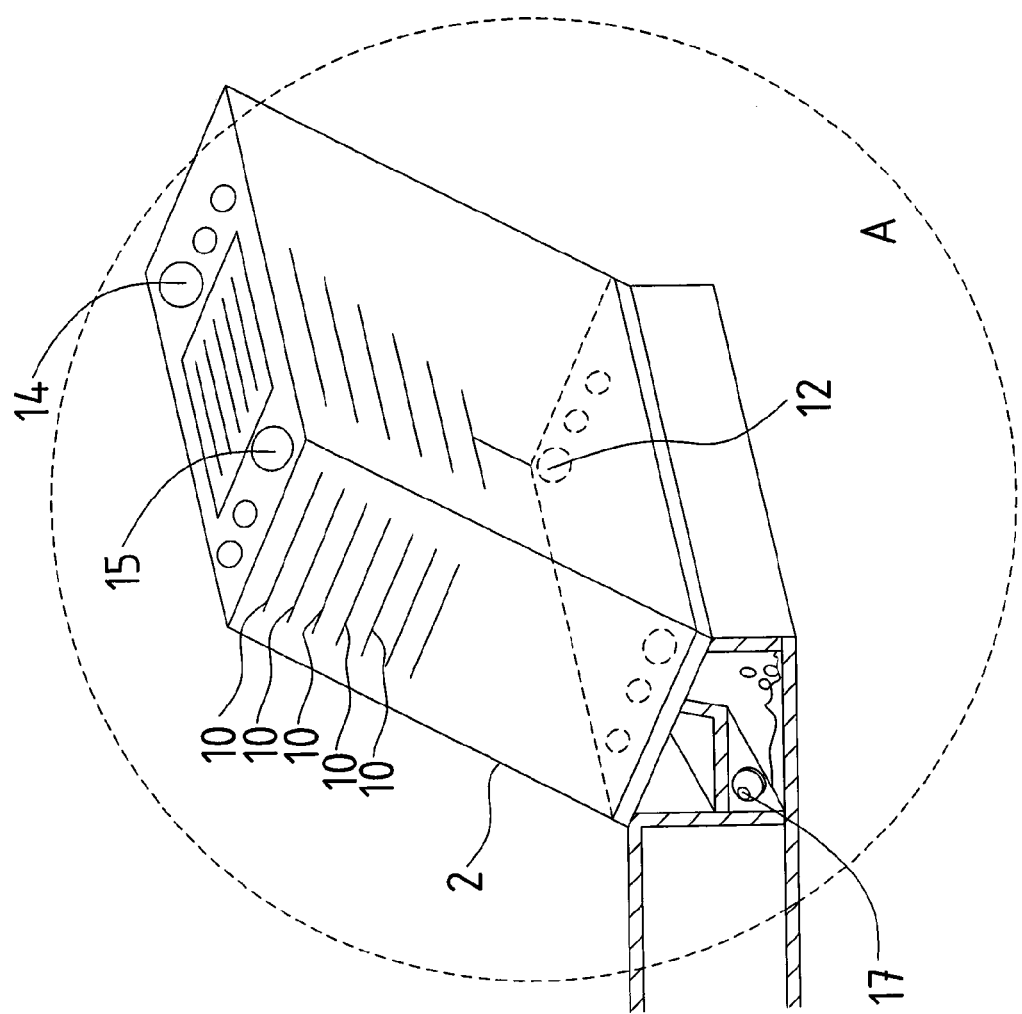
FIG. 4 is a schematic three-dimensional representation of a portion of the fuel cell system in FIG. 1 or 2, which illustrates the internal structure of the fuel cell stack of the fuel cell system.

FIG. 4 shows the portion A in FIG. 1 of the fuel cell system 1 in schematic view, to illustrate the internal structure of the fuel cell stack 2 and the arrangement of the fuel cells 10. As is clear from the schematic representation, the fuel cell stack 2 comprises a plurality of fuel cells 10 which, in areal extent, are arranged perpendicular to the longitudinal extent of the fuel cell stack 2 and parallel to one another. The fuel cells 10 are clamped together by clamping elements (not shown) to ensure electrical conductivity between the fuel cells 10. Feed air is fed into the fuel cell stack 2 via the through opening 12, such that, starting from the base attachment 3a, the feed air is guided through the through opening 12 within the fuel cell stack 2 to the open end of the fuel cell stack 2 where it may optionally exit through an outlet opening 14. The feed air is guided within the fuel cell stack 12 in the side or edge portion which is higher due to the inclination. As a result, any condensate which arises, or other liquids, drain away from the distribution channels or the feed air distribution structure due to the inclination and under the effect of gravity. The exhaust air, on the other hand, is drawn through a passage opening 15 at the open end of the fuel cell stack 2, guided through the fuel cell stack 12 and passes through the through opening 13 (FIG. 3) into the base attachment 3a. (FIG. 1) The base attachment 3a comprises a collecting vessel or sump 16 for receiving liquids or the condensate. The exhaust air is furthermore passed through a further through opening 17 into the interior of the base attachment 3a.

The main distribution channels for the exhaust air are arranged in the lower side of the fuel cell stack 2, such that the condensate which arises flows under the effect of gravity into the main distribution channels for the exhaust air, whence, likewise under the effect of gravity, it can drain automatically away into the sump 16.

This arrangement ensures that any condensate which arises is reliably discharged from the fuel cell stack 2 and has no negative effect on a subsequent cold or sub-freezing start of the fuel cell system 1. In addition, the individual fuel cells 10 are arranged such that any shear forces which arise in the event of vertical impact stresses are avoided or minimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system comprising:
    at least one fuel cell stack installed at an incline relative to a vertical axis of the fuel cell system, the vertical axis being oriented perpendicular to ground and the at least one fuel cell stack including a plurality of plate-shaped fuel cells; and
    a retaining device with which the fuel cell stack may be installed; wherein,
    the retaining device is constructed as a base; and
    the base has at least one receiving portion that is wedge-shaped in cross-section for receiving the at least one fuel cell stack.

2. The fuel cell system according to claim 1, wherein a distributor and/or sump for receiving liquid is provided in one of the base and the wedge-shaped receiving portion.

3. The fuel cell system according claim 1, wherein the base has two wedge-shaped receiving portions that are constructed for receiving two of the at least one fuel cell stack.

4. The fuel cell system according to claim 1, wherein the fuel cells in their areal extent and/or the fuel cell stack in its longitudinal extent is/are inclined relative to the vertical by an amount of 10° to 80°.

5. The fuel cell system according to claim 4, wherein said amount of incline is 30° to 60°.

6. The fuel cell system according to claim 1, wherein the fuel cells are arranged with their areal extent perpendicular to the longitudinal extent of the associated, at least one fuel cell stack.

7. A fuel cell system comprising:
    at least one fuel cell stack installed at an incline relative to a vertical axis of the fuel cell system, the vertical axis being oriented perpendicular to ground and the at least one fuel cell stack including a plurality of plate-shaped fuel cells; and
    a retaining device with which the fuel cell stack may be installed; wherein,
    the retaining device is constructed as a base; and
    the base has at least one receiving portion that is wedge-shaped in cross-section for receiving the at least one fuel cell stack;
    wherein the base has two wedge-shaped receiving portions that are constructed for receiving two of the at least one fuel cell stack; and
    wherein the two fuel cell stacks are arranged in a V-shape to one another.

8. The fuel cell system according to claim 7, wherein supply or auxiliary devices for the fuel cell stacks are arranged in the space between the two fuel cell stacks.

* * * * *